UNITED STATES PATENT OFFICE.

ARMIN EICHLER, OF NEW YORK, N. Y.

PAINT AND VARNISH.

1,133,433.　　　　　Specification of Letters Patent.　　Patented Mar. 30, 1915.

No Drawing.　　Application filed April 11, 1914.　Serial No. 831,211.

*To all whom it may concern:*

Be it known that I, ARMIN EICHLER, a citizen of the United States, residing at New York, in the county of New York and State of New York, have invented certain new and useful Improvements in Paints and Varnishes, of which the following is a specification.

My invention relates especially to bases for paints or varnishes for rendering the surfaces of various materials impervious to liquids and proof against the action of gases.

I have discovered that a very satisfactory paint or varnish base may be made from the polymerization products of the cumarone and indene group, and certain oils, with or without a suitable volatile solvent. The oils which I use are those derived from certain vegetable seeds and commercially known as linseed oil, cotton seed oil, poppy seed oil, and soy bean oil.

In preparing my new product I heat a quantity of the paracumarone or indene or both to a temperature of 160° C., at which temperature it is a liquid, and then gradually add the oil in such quantity as will produce the desired consistency. The product as thus obtained may then be used as a paint or varnish or may be mixed with a suitable volatile solvent such as turpentine, benzene, etc. Any desired coloring matter may also be added.

Having thus described my invention, what I claim is—

1. A paint or varnish comprising the polymerization products of the cumarone and indene group and linseed oil.

2. A paint or varnish comprising the polymerization products of the cumarone and indene group, linseed oil and a volatile solvent.

In testimony whereof I affix my signature in presence of two witnesses.

ARMIN EICHLER.

Witnesses:
　AUGUST C. WAETERLING,
　WM. A. COWAN.